Dec. 15, 1942.                J. W. AYDELOTTE                2,305,372
                            VEHICLE LICENSE PLATE
                            Filed April 29, 1940
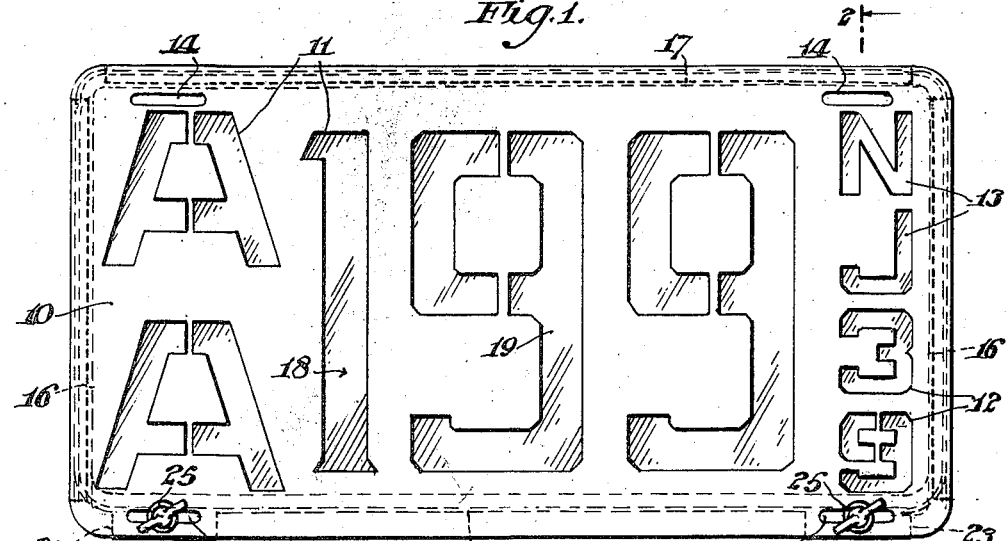
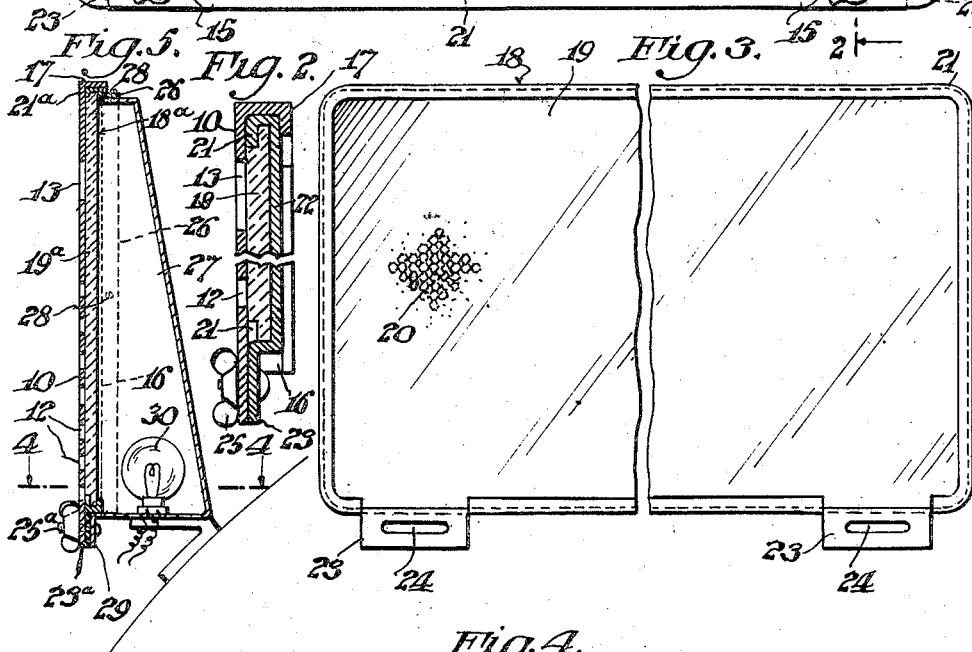
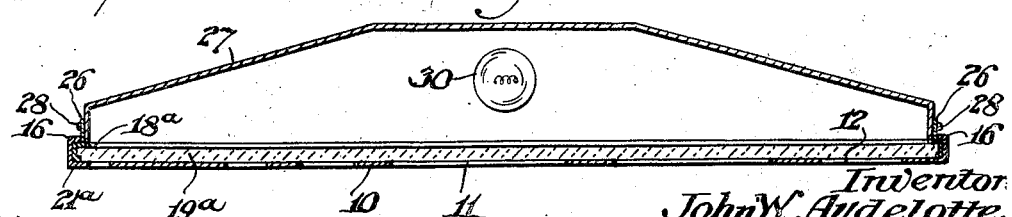
Inventor
John W. Aydelotte,
By W. B. Williamson
Attorney Patented Dec. 15, 1942

2,305,372

UNITED STATES PATENT OFFICE 2,305,372

VEHICLE LICENSE PLATE

John W. Aydelotte, Philadelphia, Pa.

Application April 29, 1940, Serial No. 332,151

2 Claims. (Cl. 40—135)

My invention relates to a new and useful vehicle license plate especially adapted for use on automobiles, both pleasure cars and trucks, motorcycles and other conveyances, required by governmental laws or regulations, to display a means of identifying the owner of the vehicle.

The main object of this invention is to combine an apertured or stencil panel having all of the data of a license plate, such as a particular number and the date or period of time for which the license is issued and the designation of the authority under which the license is issued, for instance, a State of the United States, with a panel of "Reflex" glass or similar material so that the data will be plainly visible due to reflected light coming from street lamps, the headlights of adjacent vehicles or other sources in various locations relative to that of the license plate.

Another object of the invention is to provide a vehicle license plate which is exceedingly simple in construction having the advantage of being made luminous by rays of light from an outside source located at any angle to the license plate thus making it possible to identify unlighted parked or travelling vehicles whether the lights are extinguished purposely or accidentally.

Another object of the invention is to construct a license plate which may be used with and without a light, as on the front and rear of a vehicle, and which license plate will be visible by the reflected light reaching the license plate from any angle.

A further object of the invention is to provide a license plate of unique construction combining a stencil panel having channels, and a "Reflex" panel embraced by a frame to be removably mounted in the channels of the stencil panel and held in place by fastening devices.

A still further object of the invention is to fashion the frame of the "Reflex" panel whereby the license plate may be assembled on a lamp housing.

With the above and other objects in view, this invention consists of the details of construction and combination of elements hereinafter set forth and then designated by the claims.

In order that those skilled in the art to which this invention appertains, may understand how to make and use the same, I will describe its construction, referring by numerals to the accompanying drawing forming a part hereof, in which:

Fig. 1 is a face view of a vehicle license plate constructed in accordance with my invention.

Fig. 2 is a broken enlarged sectional view on the line 2—2 of Fig. 1.

Fig. 3 is a face view of the "Reflex" panel having a portion broken out.

Fig. 4 is a horizontal sectional view on the line 4—4 of Fig. 5, of a license plate as used on a lamp housing.

Fig. 5 is a vertical sectional view thereof.

In carrying out my invention, reference first being made to Figs. 1, 2 and 3, the reference numeral 10 represents the stencil panel having a license number 11, which may include numerals and/or letters, a date or time period 12 and a state or other governmental designation 13 cut out of said panel. In addition to the above a number of slots may also be cut out of the panel, for instance, two at or near the top and two at or near the bottom designated 14 and 15 respectively.

The material of the stencil panel along two opposite edges, preferably the vertical sides, is bent back and then inward to form channels 16 and likewise one of the horizontal edges, preferably the upper one, is similarly fashioned to provide another channel 17 and these channels all cooperate to constitute a pocket for the slidable reception of the panel 18. The panel 18 includes a sheet 19 of "Reflex" glass or other material having a multiplicity of angularly arranged small facets 20, Fig. 3, covering the entire surface thereof, so that light striking said panel 18 from any direction will make it luminous to the observer. The "Reflex" sheet 19 is mounted in a frame 21 embracing all of the edges of said sheet 19 and said frame may include a back 22 disposed across the rear face of sheet 19. From one edge of the frame 21 project tongues 23 having slots 24 therein and the front faces of said tongues are preferably flush with or in the same plane as the outer face of the sheet 19 as shown in Fig. 2.

In the newer types or styles of automobiles, the license plate brackets are constructed or mounted in a way that the license plates are generally fastened at the bottoms, therefore the panel 18 is assembled in the stencil panel pocket with the slots 24 registering with the slots 15. This permits elements of fastening devices 25 to be projected through the two panels and through a bracket or other support to fasten the parts together and also mount the license plate on an automobile with one set of fastening devices.

Where the license plate is to be attached at its upper end to a bracket or other support, as in the older style automobiles, the panel 18 is inverted and assembled with the stencil panel so the slots 24 align with the slots 14 and then the fastening devices are passed through said slots and a support to secure the parts in place.

In that form of the invention illustrated in Figs. 4 and 5, the stencil panel is exactly like the one hereinbefore described wherefore the same reference numerals are applied thereto. The major difference between the two structures will be found in the reflecting panel 18a which includes a sheet 19a of "Reflex" glass or other material having a faceted surface as previously set forth. The edges of said sheet 19a are embraced by the frame 21a but said frame does not have a back and instead outwardly projecting flanges 26 are formed along three sides, for instance, the two vertical ends and the top. These flanges telescope over the front of a lamp housing 27 and screws 28 are projected through said flanges and threaded into parts of the lamp housing. The frame 21a has slotted tongues 23a which rest against lugs 29 or equivalent means on the lamp housing for the reception of the fastening devices 25a, elements of which pass through slots in the lugs 29, the tongues 23a and the stencil panel 10. In the lamp housing is a bulb 30 to supply light and since the "Reflex" glass is translucent the license plate functions as an element of a tail lamp and in such case the bulb 30 or an additional one could be wired in series with the ignition switch so that if an attempt is made to extinguish the light the motor will be stopped. Even extinguishing the light in the lamp would not impair the reflecting properties of the "Reflex" panel and the license number could be readily ascertained due to light from an outside source.

Many color combinations can be embodied in the "Reflex" panel so that the present method of identifying license plates issued by the different states through the use of various colors could be continued.

From the foregoing it will be apparent that the use of a license plate constructed as herein described would make both front and rear ones visible to pedestrians if any light is present in the vicinity of the vehicle and to other drivers when light rays from the headlights of adjacent vehicles strike a license plate. Because of the luminous aspect of these license plates they are more easily seen that present day ones and will greatly assist in the speedy apprehension of a person attempting to escape the penalties of any unlawful act and particularly a hit and run driver.

Of course I do not wish to be limited to the exact details of construction herein shown and described, as these may be varied within the scope of the appended claims without departing from the spirit of my invention.

Having described my invention, what I claim as new and useful is:

1. A vehicle license plate comprising, in combination, a stencil panel having license data in cut out formation and a pair of slots adjacent to and parallel with two edges thereof, channels formed along three edges of said panel at the rear thereof, a sheet of "Reflex" material, a frame embracing the edges of said sheet and having a back disposed across the rear of the sheet, tongues extending outwardly from said frame flush with the front of the sheet and having slots, said "Reflex" sheet and frame constituting a panel selectively insertible in the channels of the stencil panel with the slots in the tongues aligning with either pair of slots in the stencil panel and the face of the "Reflex" sheet against the rear of the cut out portion of said stencil panel, and fastening devices for projection through a support and the aligned slots to assemble the parts and support the license plate.

2. A license plate comprising a stencil panel having license data in cut-out formation and slots adjacent at least one edge, means along the other edges of said panel to engage the edges of a second panel, said second panel consisting of a sheet of "Reflex" material and a frame disposed about the edges of said material, and tongues on said frame having slots therein, said last named slots aligning with the first named ones when the second panel is placed in the stencil panel.

JOHN W. AYDELOTTE.